United States Patent
Fan et al.

(10) Patent No.: US 7,612,998 B2
(45) Date of Patent: Nov. 3, 2009

(54) PORTABLE COMPUTER WITH HANDLE ATTACHED THERETO

(75) Inventors: Qi-Fei Fan, Guangdong (CN); Xiao-Gang Jiang, Guangdong (CN); Zhi-Gang Chen, Guangdong (CN); Xin-Hu Gong, Guangdong (CN)

(73) Assignees: Hong Fu Jin Precision Industry (Shen Zhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 500 days.

(21) Appl. No.: 11/306,040

(22) Filed: Dec. 14, 2005

(65) Prior Publication Data

US 2006/0196235 A1    Sep. 7, 2006

(30) Foreign Application Priority Data

Feb. 4, 2005    (CN)    ............... 2005 2 0054788 U

(51) Int. Cl.
*G06F 1/16* (2006.01)
*H05K 5/00* (2006.01)
*H05K 7/00* (2006.01)

(52) U.S. Cl. .............. 361/679.59; 361/679.55

(58) Field of Classification Search ............ 292/116; 70/58; 361/683, 679.55, 679.58, 679.59
See application file for complete search history.

(56) References Cited

U.S. PATENT DOCUMENTS

| | | | | |
|---|---|---|---|---|
| 3,924,775 A | * | 12/1975 | Andreaggi et al. | 220/756 |
| 4,111,016 A | * | 9/1978 | Dawson | 70/58 |
| 4,196,821 A | * | 4/1980 | Teti et al. | 220/756 |
| 4,515,419 A | * | 5/1985 | Hampel et al. | 312/7.1 |
| 4,830,531 A | * | 5/1989 | Condit et al. | 403/348 |
| 4,895,231 A | * | 1/1990 | Yamaguchi et al. | 190/115 |
| 5,100,098 A | * | 3/1992 | Hawkins | 248/291.1 |
| 5,168,601 A | * | 12/1992 | Liu | 16/445 |
| 5,235,495 A | * | 8/1993 | Blair et al. | 361/679.26 |
| 5,293,300 A | * | 3/1994 | Leung | 361/679.59 |
| 5,351,508 A | | 10/1994 | Kelley | |
| 5,721,668 A | * | 2/1998 | Barrus et al. | 361/679.59 |
| 6,000,251 A | * | 12/1999 | Murray et al. | 70/58 |
| 6,017,106 A | * | 1/2000 | Adams et al. | 312/223.2 |
| 6,097,592 A | * | 8/2000 | Seo et al. | 361/679.55 |
| 6,115,883 A | * | 9/2000 | Um | 16/405 |
| 6,463,770 B1 | * | 10/2002 | Lee | 70/58 |
| 6,636,420 B2 | * | 10/2003 | Nakano et al. | 361/682 |
| 6,995,977 B2 | * | 2/2006 | Yang | 361/683 |
| 7,035,093 B2 | * | 4/2006 | Imsand | 361/683 |

(Continued)

*Primary Examiner*—Jayprakash N Gandhi
*Assistant Examiner*—Quinn Hunter
(74) *Attorney, Agent, or Firm*—Winston Hsu

(57) ABSTRACT

A portable computer includes a main body, a retention portion being arranged on the main body with a part thereof spaced apart from the main body, and a fastener for detachably attaching a handle between the main body and the retention portion. A through hole is defined in the retention portion, a through hole is defined in the handle, and a locking aperture is defined in the main body. The fastener includes a hook extending through the through hole of the retention portion, the through hole of the handle, and the locking aperture of the main body. The locking aperture of the main body is not round, so that the fastener is rotatable to a position in which the hook engages with the main body beside an edge of the locking aperture.

18 Claims, 8 Drawing Sheets

U.S. PATENT DOCUMENTS 7,054,152 B2 * 5/2006 Francke et al. .............. 361/685
7,450,372 B2 * 11/2008 Lin et al. .................... 361/683
2007/0076362 A1 * 4/2007 Lagnado .................... 361/683

* cited by examiner

PORTABLE COMPUTER WITH HANDLE ATTACHED THERETO

FIELD OF THE INVENTION

The present invention relates to a portable computer, and more particularly to a portable computer incorporates a handle.

DESCRIPTION OF RELATED ART

Portable computers, such as laptop computers and notebook computers, have become increasingly popular for general use. To facilitate carrying portable computers, a handle is attached to a portable computer with screws. However, screwing or unscrewing the handle to the portable computer via screwdrivers is unduly cumbersome and time consuming. In addition, it is inconvenient for the users to assemble or disassemble the handle to or from the portable computer at anytime or anywhere needed.

What is desired, therefore, is a portable computer which has an improved fixing mechanism to attach the handle thereto.

SUMMARY OF INVENTION

In one preferred embodiment, a portable computer includes a main body, a retention portion being arranged on the main body with a part thereof spaced apart from the main body, and a fastener for detachably attaching a handle between the main body and the retention portion. A through hole is defined in the retention portion, a through hole is defined in the handle, and a locking aperture is defined in the main body. The fastener includes a hook extending through the through hole of the retention portion, the through hole of the handle, and the locking aperture of the main body. The locking aperture of the main body is not round, so that the fastener is rotatable to a position in which the hook engages with the main body beside an edge of the locking aperture.

Other advantages and novel features will become more apparent from the following detailed description of preferred embodiments when taken in conjunction with the accompanying drawings, in which:

DETAILED DESCRIPTION

Figure 1:
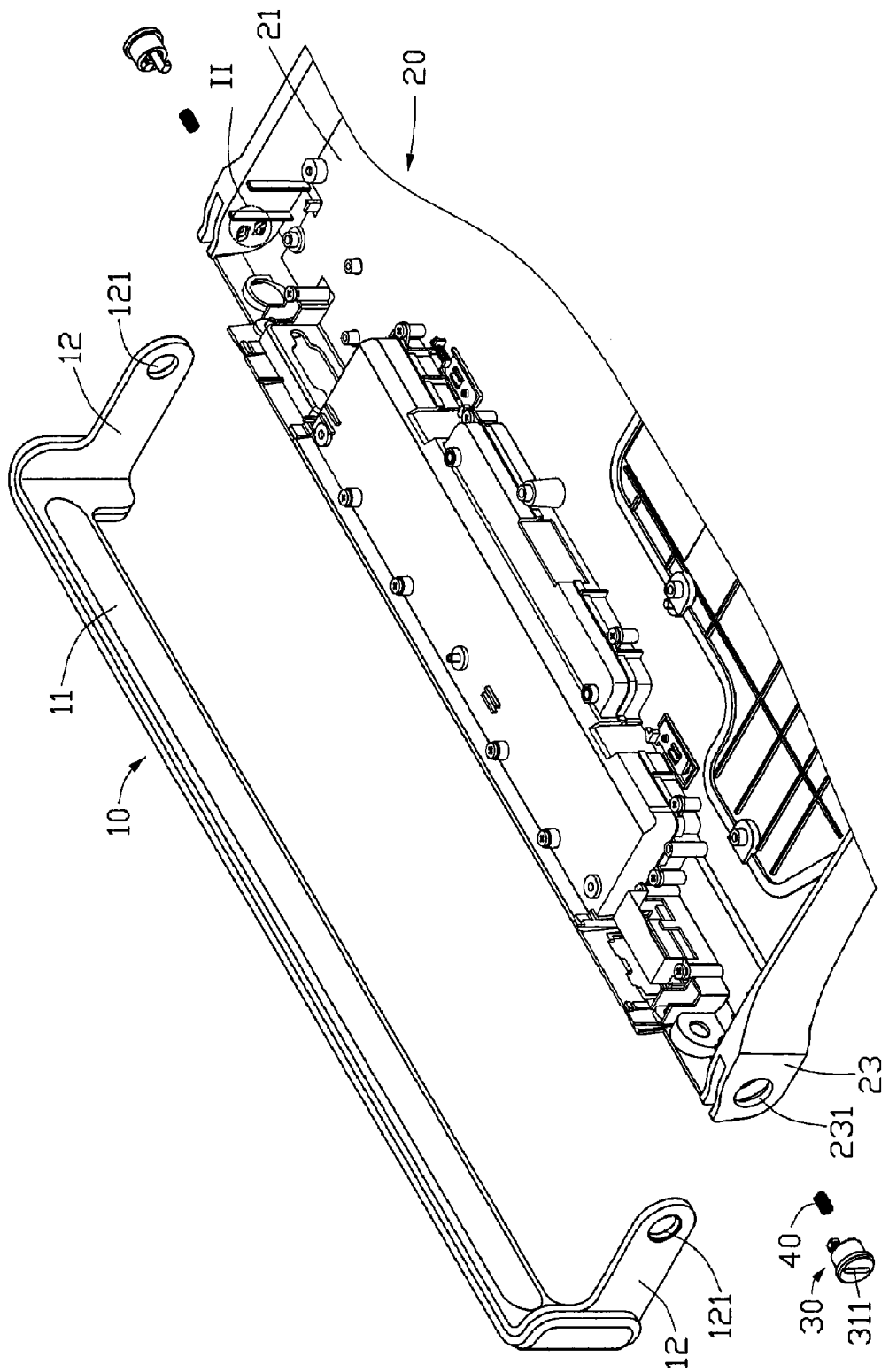
FIG. 1 is an exploded, isometric view of a portable computer and a handle in accordance with a preferred embodiment of the present invention, the portable computer including a main body, a pair of fasteners and a pair of resilient elements.
Figure 2:
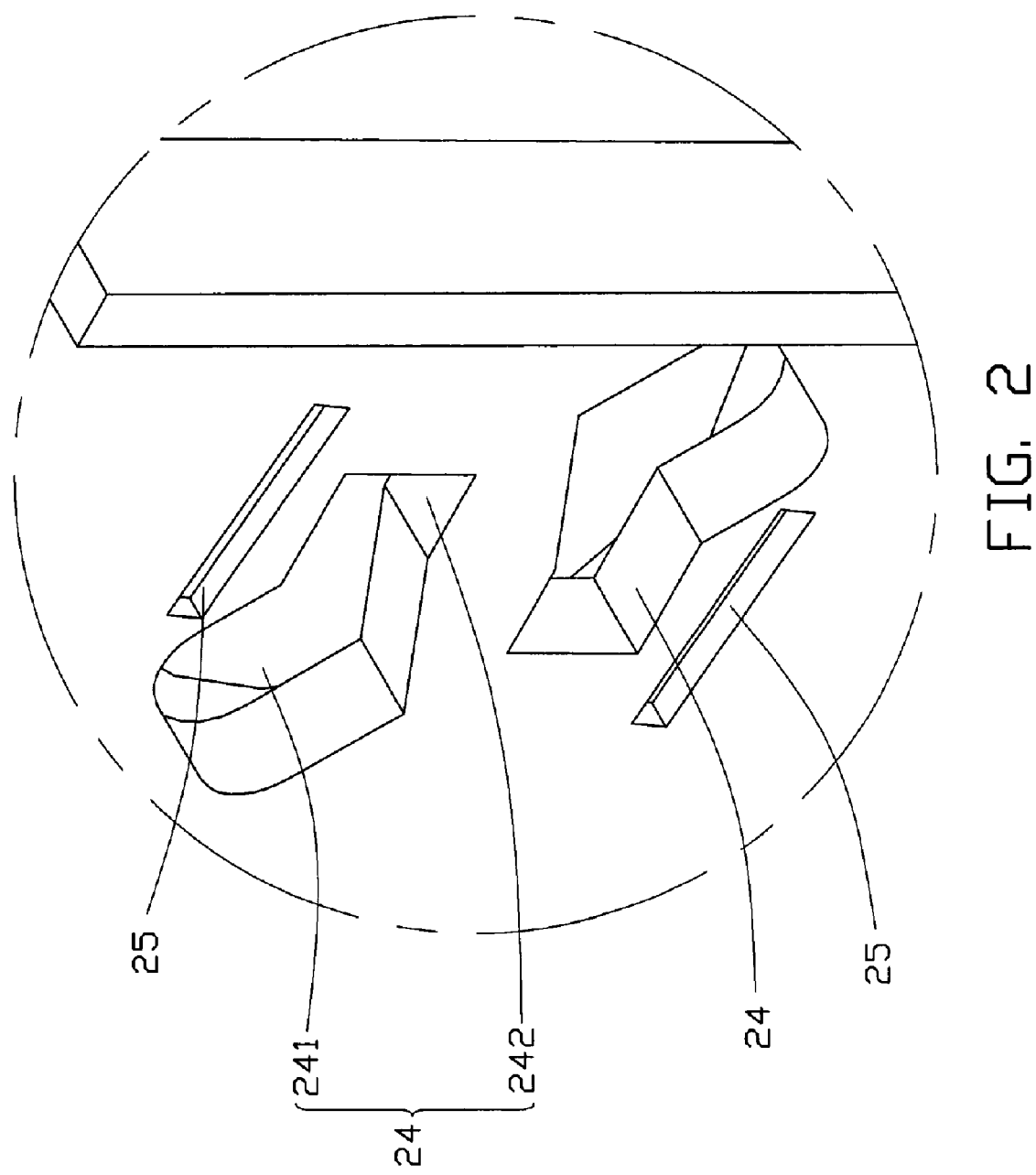
FIG. 2 is an enlarged view of the encircled portion II of FIG. 1.
Figure 8:
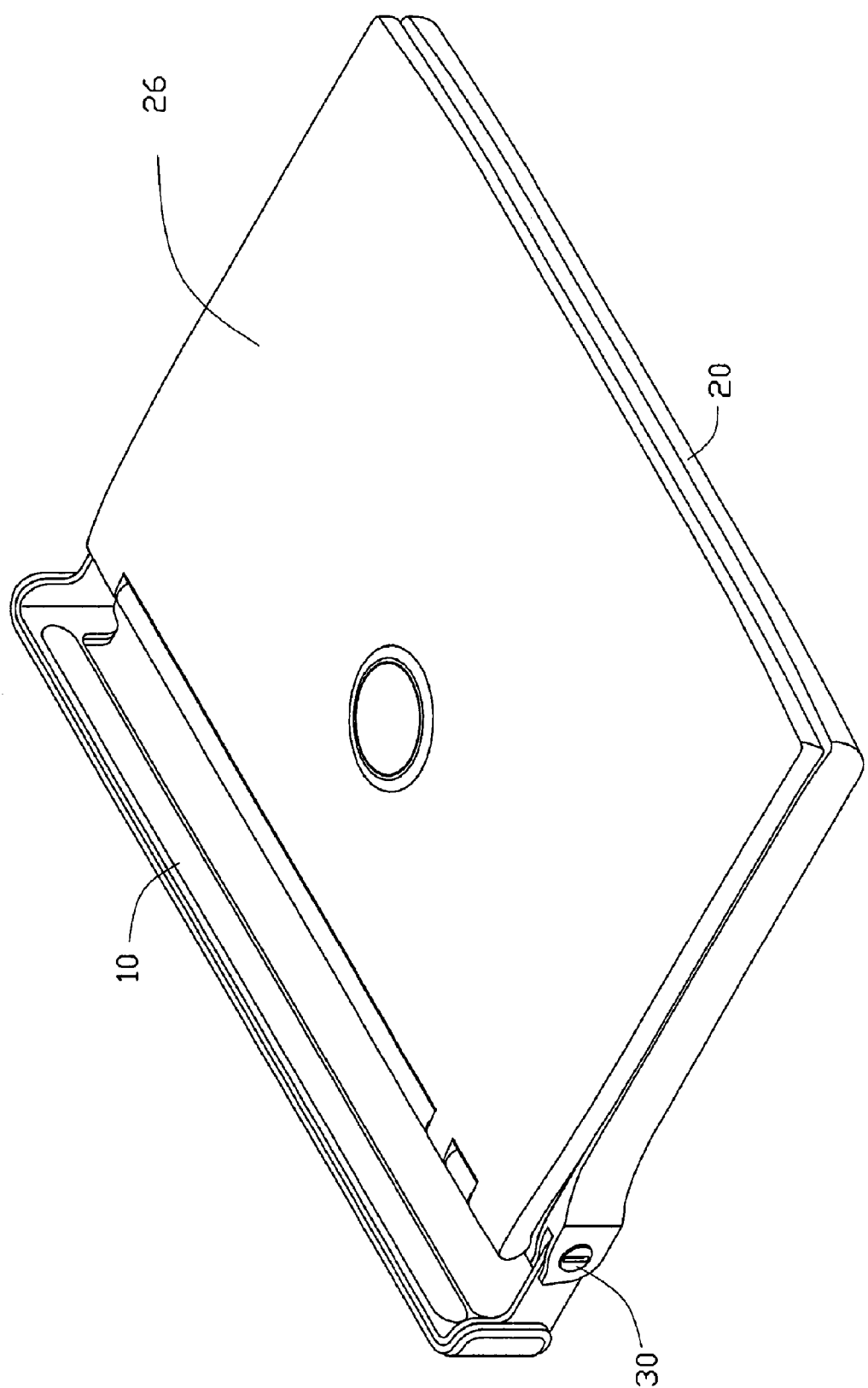
FIG. 8 is an entire assembled view of the portable computer and the handle of FIG. 1, together with an LCD panel.

Referring to FIGS. 1, 2 and 8, a handle 10 is provided to be used with a computer like a portable computer 20. The handle 10 is a functional part of the portable computer 20 and capable of being used as a carrying handle in one of its positions and a stand of the computer 20 in another of its positions. The handle 10 includes a crossbar 11, and a pair of arms 12 protruding from opposite ends of the crossbar 11 respectively. A through hole 121 is defined in a free end of each arm 12. The portable computer 20 includes a main body 21. For better illustration, an upper panel and a pivotable LCD panel 26 are omitted. A pair of retention portions 23 protrudes rearward along lateral sides of the main body 21 respectively. The retention portions 23 are spaced from the main body 21. A through hole 231 is defined in a free end of each retention portion 23. Two locking apertures 24 are defined in the main body 21 corresponding to each through hole 231. The two locking apertures 24 are symmetrical with each other. Each locking aperture 24 includes a wide access section 241, and a narrow locking section 242. A slim locking slot 25 is defined in the main body 21 in the vicinity of each locking section 242.

Figure 3:
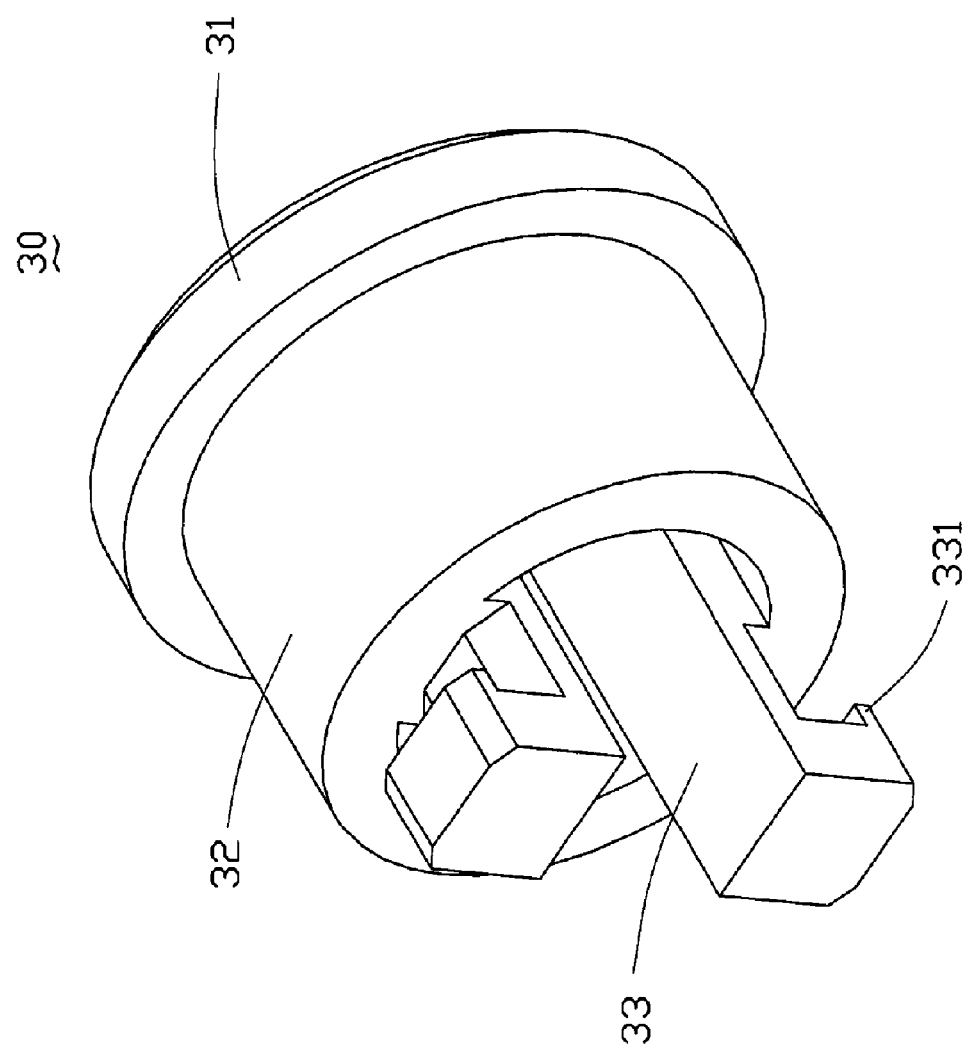
FIG. 3 is an enlarged isometric view of each fastener of FIG. 1.
Figure 4:
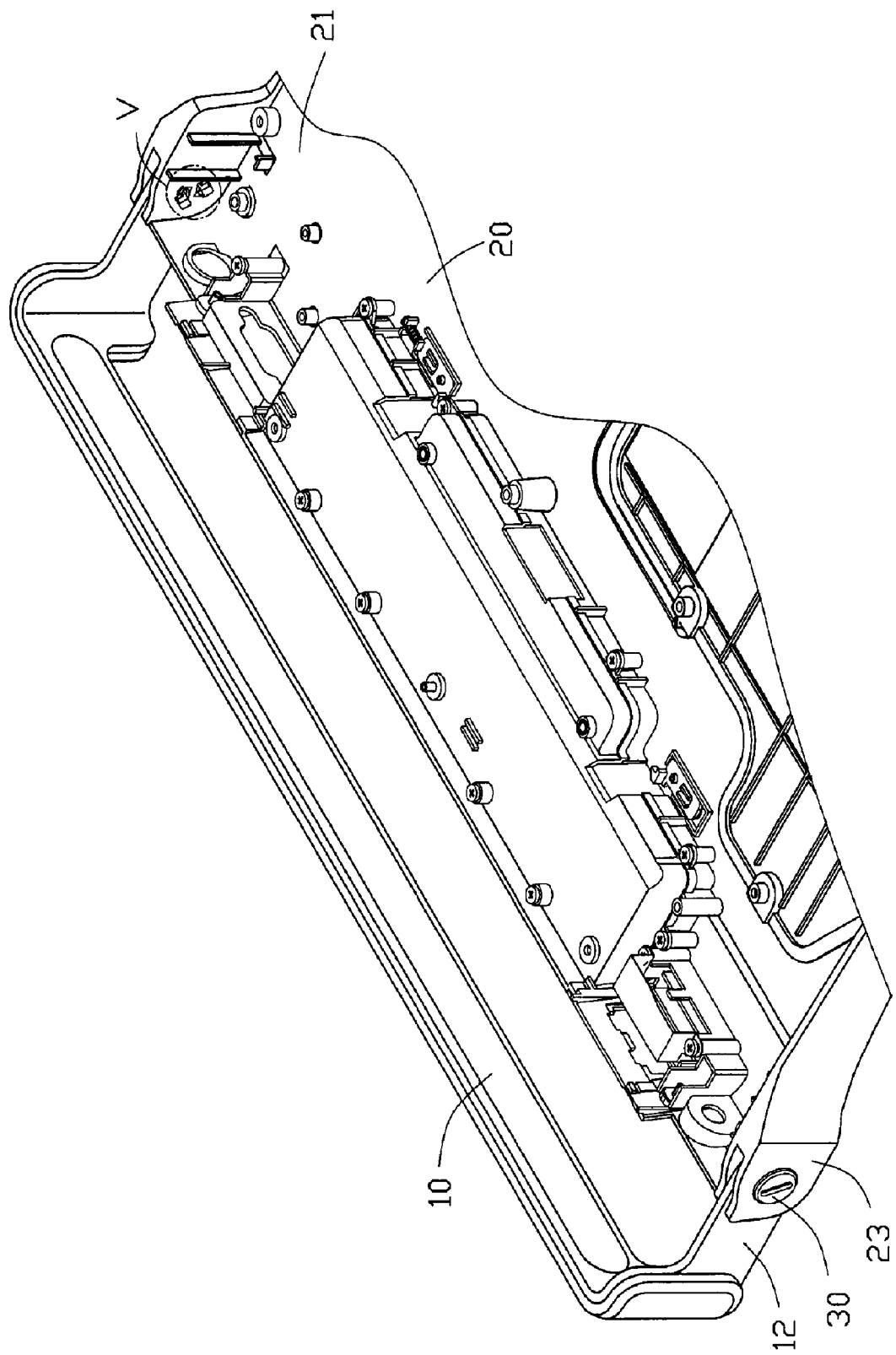
FIG. 4 is an assembled view of FIG. 1, showing the fasteners in an unlocked position.
Figure 5:
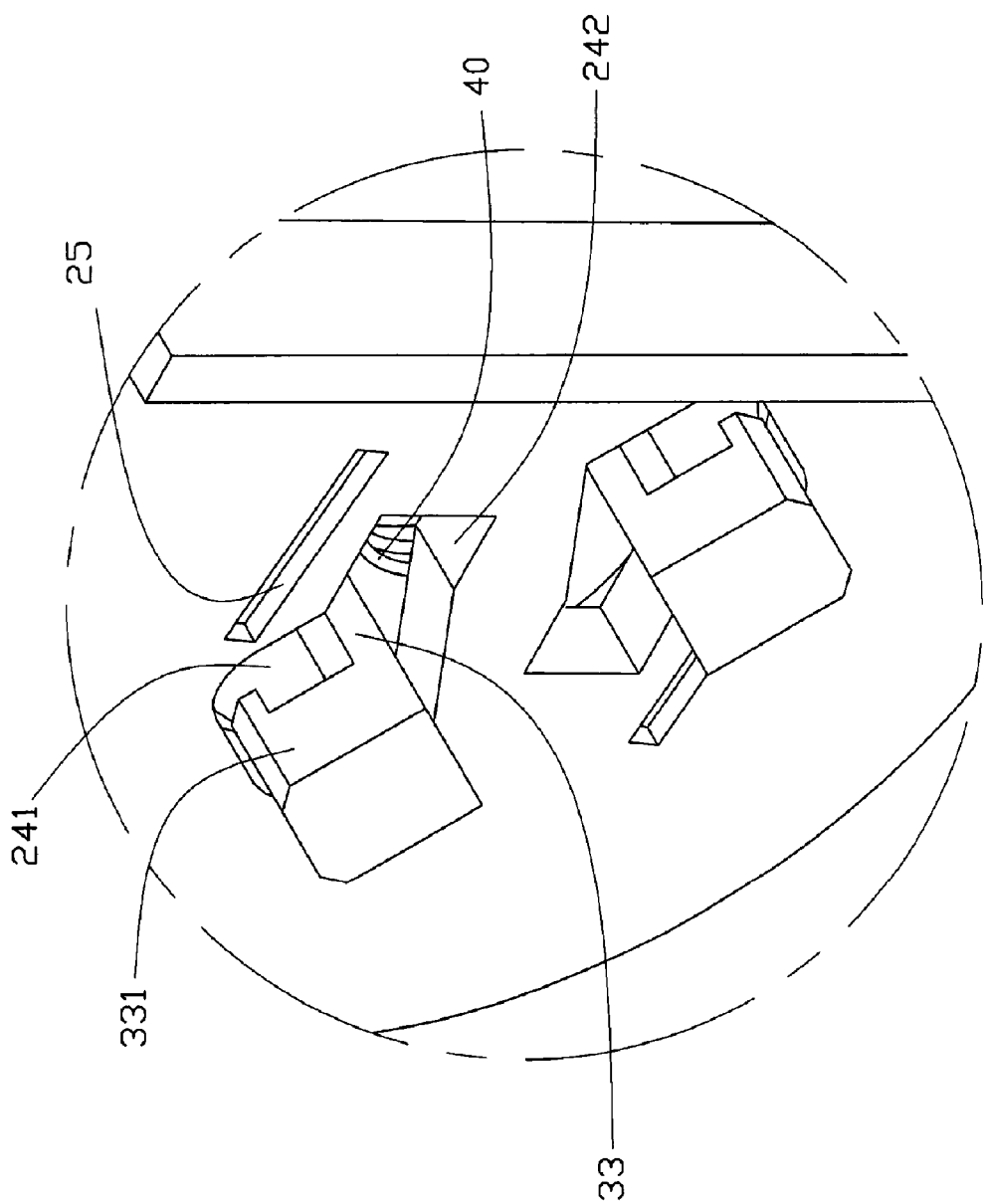
FIG. 5 is an enlarged view of the encircled portion V of FIG. 4.
Figure 6:
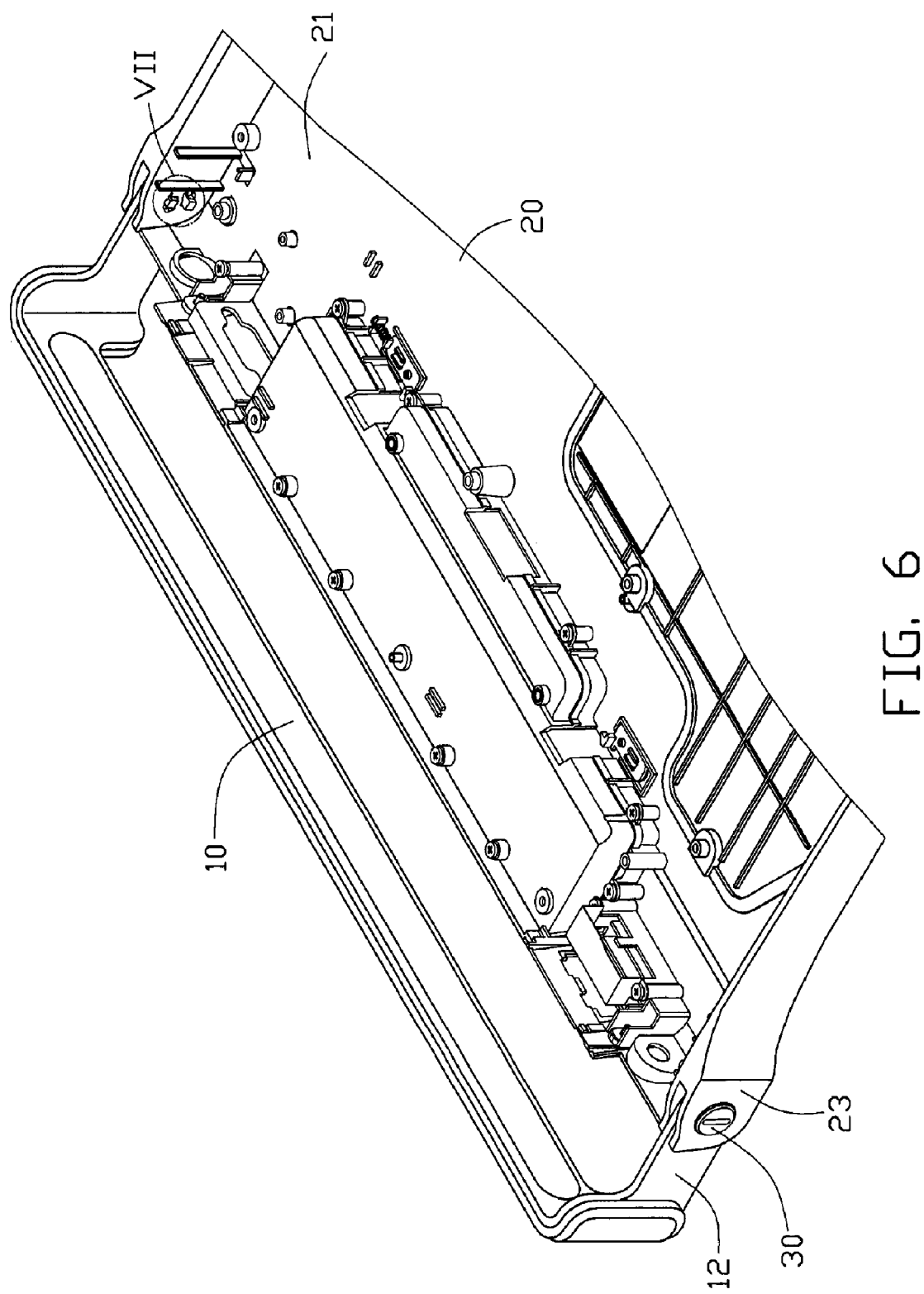
FIG. 6 is an assembled view of FIG. 1, showing the fasteners in a locking position.
Figure 7:
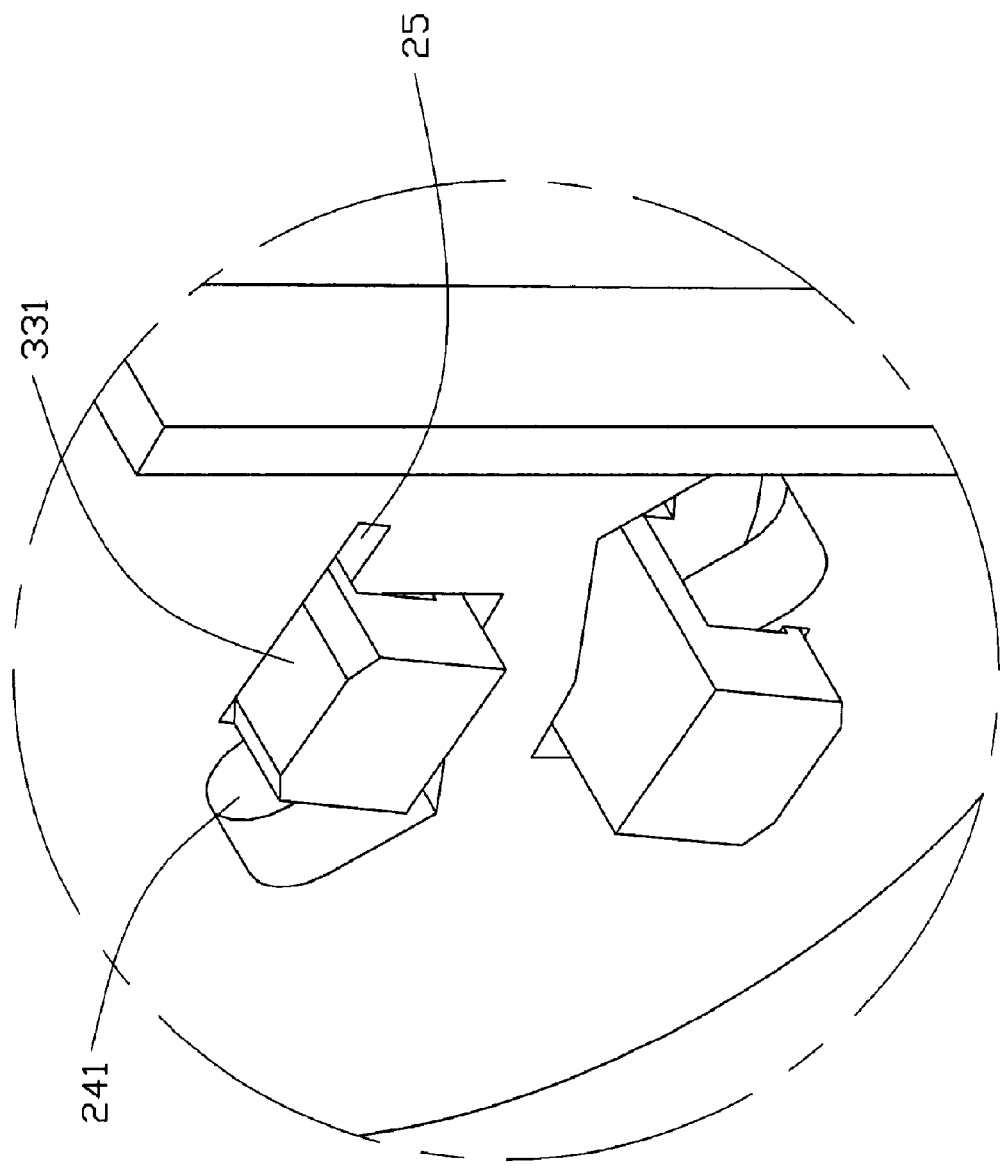
FIG. 7 is an enlarged view of the encircled portion VII of FIG. 6.

A pair fasteners 30 and a pair of resilient elements are provided to attach the handle 10 to the main body 21 of the portable computer 20. Referring also to FIG. 3, each fastener 30 includes a circular head portion 31, a hollow shaft 32 extending from the head portion 31, and a pair of clasp portions 33 extending from the shaft 32. An L-shaped hook 331 extends outwardly from a free end of each clasp portion 33. A slot 311 is defined in an outer surface of the head portion 31 of each fastener 30. The slot 311 is straight and has a relative wide width to facilitate users' operation. Each resilient element 40 is a coil spring, and placed between the two clasp portions 33 of the corresponding fastener 30. A diameter of each head portion 31 is greater than that of the shaft 32 and that of the through hole 121 of the handle 10, but is less than that of the through hole 231 of the retention portion 23.

Referring also to FIGS. 4-7, in assembly, the arms 12 of the handle 10 are inserted between the main body 20 and the retention portions 23 respectively, with the through holes 121 of the arms 12 aligning with corresponding through holes 231 of the retention portions 23. For simplicity, only one of the fasteners 30 is described herein. The shaft 32 of the fastener 30 together with its resilient element 40 extends through the through hole 231 of the corresponding retention portion 23, and the through hole 121 of the handle 10. The two clasp portions 33 extend through the access sections 241 of the two corresponding locking apertures 24. The resilient element 40 abuts against the main body 21 between the two locking apertures 24, and is compressed. Rotating the fastener 30 until the hooks 331 is in alignment with the locking slots 25, and then releasing the fastener 30. The resilient element 40 is restored, and urges the hooks 331 to be engagingly received in the locking slots 25. The head portion 31 is received in the through hole 231 of the retention portion 23.

When it is desired to detach the handle 10 from the main body 21, the fastener 30 is pressed inwardly, so that the hooks 331 leave the locking slots 25. Rotating the fastener 30 until the hooks 331 align with the access sections 241 of the locking aperture 24. The fastener 30 is pushed outwardly by the restoring force of the resilient element 40, so that the fastener 30 is readily to be taken out from the main body 21. The handle 10 is thus readily taken out from the main body 21.

It is believed that the present embodiment and its advantages will be understood from the foregoing description, and it will be apparent that various changes may be made thereto without departing from the spirit and scope of the invention or sacrificing all of its material advantages, the example hereinbefore described merely being a preferred or exemplary embodiment.

What is claimed is:

1. A portable computer comprising:
   a main body, a retention portion being arranged on the main body with a part thereof spaced apart from the main body, a through hole defined in the retention portion, and two locking apertures defined in the main body;
   a fastener for detachably attaching a handle between the main body and the retention portion; the fastener comprising a head portion, a hollow shaft extending from the head portion, and a pair of hooks extending from the hollow shaft; the hooks extending through the through hole of the retention portion, a through hole of the handle, and the locking apertures of the main body respectively; wherein the locking apertures of the main body are not round, so that the fastener is rotatable to a position in which the hooks engage with the main body beside edges of the locking apertures; and
   a resilient comprising two ends, wherein one of the ends is received in the hollow shaft, the other one of the ends contacts and presses against the main body between the two locking apertures for maintaining the hook in said position.

2. The portable computer as claimed in claim 1, wherein each of the locking apertures comprises a wide access section and a narrow locking section.

3. The portable computer as claimed in claim 2, wherein the main body defines a locking slot beside the locking section of each of the locking aperture apertures for the corresponding hook engaging therein.

4. The portable computer as claimed in claim 1, wherein the resilient element is a coil spring disposed between the hooks.

5. The portable computer as claimed in claim 1, wherein the diameter of the head portion is less than that of the through hole of the retention portion, and greater than that of the through hole of the handle.

6. The portable computer as claimed in claim 1, wherein an outer surface of the head portion defines a straight slot for facilitating operation.

7. A portable computer comprising:
   a main body defining two locking apertures therein;
   a fastener for detachably attaching a handle to the main body; the fastener comprising a hollow shaft going through a through hole of the handle, and two hooks extending through the through hole of the handle, and the locking apertures of the main body; wherein the fastener is rotatable to a position in which the hooks engage with the main body beside edges of the locking apertures; and
   a resilient element received in the hollow shaft between the two hooks, and biasing a portion of the main body between the two locking apertures for maintaining the hook in said position.

8. The portable computer as claimed in claim 7, wherein each of the locking apertures comprises a wide access section and narrow locking section.

9. The portable computer as claimed in claim 8, wherein the main body defines a locking slot beside the locking section of each of the locking apertures for the corresponding hook engaging therein.

10. The portable computer as claimed in claim 7, wherein the fastener comprises a large head portion, the hollow shaft extends from the head portion.

11. The portable computer as claimed in claim 10, wherein the resilient element is a coil spring.

12. The portable computer as claimed in claim 7, wherein a diameter of the head portion is greater than that of the through hole of the handle.

13. The portable computer as claimed in claim 7, further comprising a retention portion being arranged on the main body with a part thereof spaced apart from the main body, wherein the handle is placed between the main body and the retention portion.

14. The portable computer as claimed in claim 13, wherein the retention portion defines a through hole therein for extension of the fastener therethrough.

15. A portable computer comprising:
    a main body defining two locking apertures therein;
    a fastener for detachably attaching a handle to the main body; the fastener comprising an enlarged head portion, a hollow shaft extending from a middle portion of the head portion, and a pair of hooks extending from the hollow shaft; wherein the hollow shaft together with the hooks go through a through hole of the handle, the head portion is blocked from going through the through hole of the handle, the hooks respectively extend through the locking apertures of the main body, and the fastener is rotatable to a position in which the hooks engage with the main body beside edges of the locking apertures; and
    a resilient element received in the hollow shaft and between the two hooks, wherein the resilient element comprising two ends, one of the ends is received in the hollow shaft, the other one of the ends contacts and presses against the main body between the two locking apertures for maintaining the hook in said position.

16. The portable computer as claimed in claim 15, wherein a retention portion being arranged on the main body with a part thereof spaced apart from the main body, a through hole defined in the retention portion, the handle comprises an arm defining the through hole of the handle, upon the condition that the handle is attached to the main body, the arm is located between the main body and the retention portion and the head portion is received in the through hole of the retention portion.

17. The portable computer as claimed in claim 15, wherein each of the locking apertures comprises a wide access section and a narrow locking section.

18. The portable computer as claimed in claim 17, wherein the main body defines a locking slot beside the locking section of each of the locking apertures for the corresponding hook engaging therein.

* * * * *

UNITED STATES PATENT AND TRADEMARK OFFICE
CERTIFICATE OF CORRECTION

| | | |
|---|---|---|
| PATENT NO. | : 7,612,998 B2 | Page 1 of 1 |
| APPLICATION NO. | : 11/306040 | |
| DATED | : November 3, 2009 | |
| INVENTOR(S) | : Fan et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 793 days.

Signed and Sealed this

Nineteenth Day of October, 2010

David J. Kappos
*Director of the United States Patent and Trademark Office*